H. T. WIGGINTON.
Animal-Trap.
No. 202,971. Patented April 30, 1878.
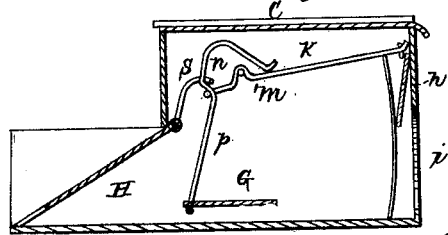
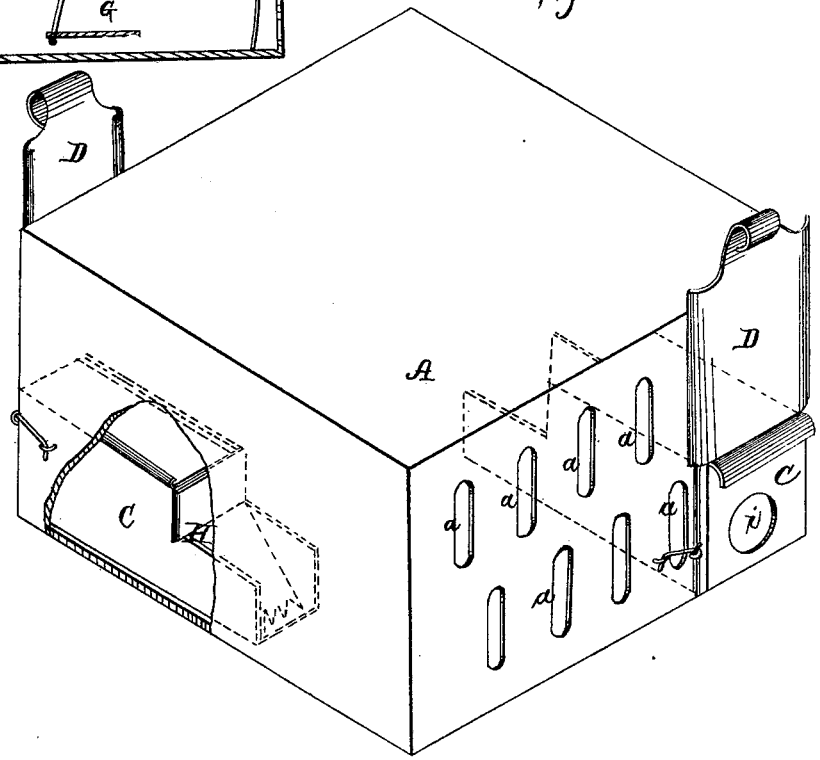
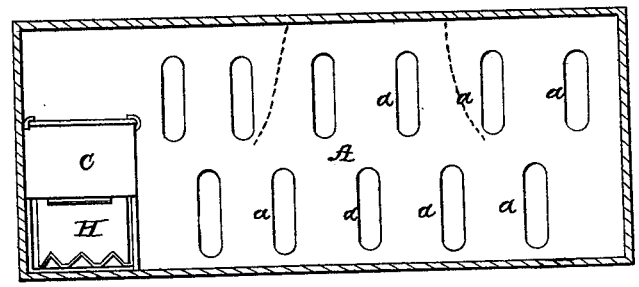
INVENTOR
Henry T. Wigginton
WITNESSES

UNITED STATES PATENT OFFICE.

HENRY T. WIGGINTON, OF AUXVASSE, MISSOURI.

IMPROVEMENT IN ANIMAL-TRAPS.

Specification forming part of Letters Patent No. 202,971, dated April 30, 1878; application filed January 31, 1878.

*To all whom it may concern:*

Be it known that I, HENRY T. WIGGINTON, of Auxvasse, in the county of Calloway, and in the State of Missouri, have invented certain new and useful Improvements in Animal-Traps; and do hereby declare that the following is a full, clear, and exact description thereof, reference being had to the accompanying drawings, and to the letters of reference marked thereon, making a part of this specification.

The nature of my invention consists in the construction and arrangement of an animal-trap, as will be hereinafter more fully set forth.

In order to enable others skilled in the art to which my invention appertains to make and use the same, I will now proceed to describe its construction and operation, referring to the annexed drawing, in which—

Figure 1 is a perspective view of the entire animal-trap. Fig. 2 is a longitudinal vertical section of the same. Fig. 3 is a longitudinal section of a removable box used therein.

A represents a cage of any suitable dimensions, provided with one or more small catch-boxes, C, which are adjustable so as to be placed for any desired distance of their length inside of the cage, or when either box is removed altogether, the opening for the same may be closed by means of a sliding door, D.

The sides of the cage A are provided with small openings $a\ a$, to give light inside of the same.

Each box C is provided with an entrance, $i$, in the front, over which hangs a swinging door, $h$. This door is hung upon wire arms or levers $k\ k$, or it may be secured to them. The arms or levers $k\ k$ extend back and pass over a wire, $m$, fastened across the back part of the box, said arms being bent to form bearings on said wire.

In the back end of the box is a treadle, G, to which is fastened a bait-staff, $p$. In this bait-staff is a short bend or hook, $n$, to drop over the back end of the wire arms $k$ when the door is raised.

When the animal enters the box, either by nibbling at the bait on the bait-staff or treading on the treadle, it releases the hook $n$ from the wire arms, letting the door $h$ drop over the entrance $i$, making escape impossible only to the cage A.

At the back end of the box C is provided a drop tin or wire grating, H, to which is fastened a wire arm, $s$, projecting over the back end of the wire arms $k$. The animal going from the box into the cage passes under the drop-tin H, raising the same. This movement of the drop H causes the arm $s$ to pull down the arms $k$ until the hook $n$ will fall over the same, and thus set the trap. The animal passing into the cage, the drop H closes behind him, thus making escape impossible.

Having thus fully described my invention, what I claim as new, and desire to secure by Letters Patent, is—

The combination, in an animal-trap, of a cage, A, having inclosed therein one or more removable and adjustable catch-boxes, C C, provided with closing and setting devices, and sliding doors D, arranged on the cage for closing the openings when the boxes are removed, substantially as herein set forth.

In testimony that I claim the foregoing I have hereunto set my hand this 9th day of January, 1878.

HENRY T. WIGGINTON.

Witnesses:
W. H. KENNAN,
D. H. McINTYRE.